US012630014B2

(12) United States Patent
Chen et al.

(10) Patent No.: US 12,630,014 B2
(45) Date of Patent: May 19, 2026

(54) SIDE WINDOW DISPLAY SYSTEM ON VEHICLE

(71) Applicant: AUO Corporation, Hsinchu (TW)

(72) Inventors: Yu-Chi Chen, Hsinchu (TW); Chi-Yu Liu, Hsinchu (TW); Chia-Sheng Cheng, Hsinchu (TW)

(73) Assignee: AUO Corporation, Hsinchu City (TW)

( * ) Notice: Subject to any disclaimer, the term of this patent is extended or adjusted under 35 U.S.C. 154(b) by 158 days.

(21) Appl. No.: 18/391,671

(22) Filed: Dec. 21, 2023

(65) Prior Publication Data

US 2025/0196635 A1     Jun. 19, 2025

(30) Foreign Application Priority Data

Dec. 14, 2023     (TW) .................................. 112148835

(51) Int. Cl.
*B60K 35/22*          (2024.01)
*B60K 35/235*        (2024.01)
(Continued)

(52) U.S. Cl.
CPC ............ *B60K 35/22* (2024.01); *B60K 35/235* (2024.01); *B60K 35/285* (2024.01); *G06F 3/04817* (2013.01); *G06F 3/0486* (2013.01); *G06F 3/0488* (2013.01); *G06F 3/167* (2013.01); *G06V 10/60* (2022.01); *G06V 20/56* (2022.01);
(Continued)

(58) Field of Classification Search
CPC .... B60K 35/22; B60K 35/235; B60K 35/285; B60K 2360/119; B60K 2360/1434; B60K 2360/1468; B60K 2360/148; B60K 2360/178; B60K 2360/332; B60K 2360/349; B60K 2360/785; G06F 3/04817; G06F 3/0486; G06F 3/0488; G06F 3/167;
(Continued)

(56) References Cited

U.S. PATENT DOCUMENTS 10,026,363 B2     7/2018   Naoto et al.
10,726,812 B2     7/2020   Hélot et al.
(Continued)

FOREIGN PATENT DOCUMENTS

CN          105501033          4/2016
CN          109641523          4/2019
(Continued)

*Primary Examiner* — Muhammad Shafi
(74) *Attorney, Agent, or Firm* — JCIPRNET

(57)          ABSTRACT

A side window display system on vehicles is provided. The side window display system on vehicles includes a transparent display, at least one external sensor, at least one internal sensor and a controller. The transparent display is provided on a side window of a vehicle. The external sensor is used to detect an external environment of the vehicle to provide external environment information. The internal sensor is used to detect an internal environment of the vehicle to provide internal environment information. The controller is coupled to the transparent display, the external sensor, and the internal sensor to select an operation mode based on the internal environment information, and controls the transparency distribution and brightness distribution of the transparent display based on the operation mode and the external environment information.

12 Claims, 19 Drawing Sheets

(51) Int. Cl.

| | |
|---|---|
| *B60K 35/28* | (2024.01) |
| *G06F 3/04817* | (2022.01) |
| *G06F 3/0486* | (2013.01) |
| *G06F 3/0488* | (2022.01) |
| *G06F 3/16* | (2006.01) |
| *G06V 10/60* | (2022.01) |
| *G06V 20/56* | (2022.01) |
| *G06V 20/59* | (2022.01) |
| *G06V 40/10* | (2022.01) |

(52) U.S. Cl.
CPC .............. *G06V 20/59* (2022.01); *G06V 40/10* (2022.01); *B60K 2360/119* (2024.01); *B60K 2360/1434* (2024.01); *B60K 2360/1468* (2024.01); *B60K 2360/148* (2024.01); *B60K 2360/178* (2024.01); *B60K 2360/332* (2024.01); *B60K 2360/349* (2024.01); *B60K 2360/785* (2024.01)

(58) Field of Classification Search
CPC ........ G06V 10/60; G06V 20/56; G06V 20/59; G06V 40/10
USPC .......................................................... 701/36
See application file for complete search history.

(56) References Cited

U.S. PATENT DOCUMENTS

| | | | | |
|---|---|---|---|---|
| 11,351,892 | B1 * | 6/2022 | Roy | ......................... G05D 1/43 |
| 11,383,644 | B2 * | 7/2022 | Witte | ..................... H04N 7/181 |
| 12,175,908 | B1 * | 12/2024 | Cory | ......................... G09G 3/20 |
| 2016/0104437 | A1 | 4/2016 | Naoto et al. | |
| 2019/0189087 | A1 | 6/2019 | Hélot et al. | |
| 2023/0219418 | A1 | 7/2023 | Kim | |
| 2023/0219419 | A1 | 7/2023 | Kim | |
| 2023/0219465 | A1 | 7/2023 | Kim | |
| 2023/0221798 | A1 | 7/2023 | Kim | |
| 2023/0226910 | A1 | 7/2023 | Kim | |

FOREIGN PATENT DOCUMENTS

| | | | |
|---|---|---|---|
| CN | 109857326 | | 6/2019 |
| CN | 112660022 | | 4/2021 |
| CN | 113306599 | * | 8/2021 |
| CN | 115675305 | | 2/2023 |
| CN | 115756162 | | 3/2023 |
| CN | 116301323 | | 6/2023 |
| CN | 116424173 | A | 7/2023 |
| KR | 20230108809 | * | 7/2023 |
| TW | 201945224 | A | 12/2019 |
| WO | WO-2023184276 | * | 10/2023 |

* cited by examiner

170

410 420 430 440

170

543a

170

543a

547

SIDE WINDOW DISPLAY SYSTEM ON VEHICLE

CROSS-REFERENCE TO RELATED APPLICATION

This application claims the priority benefit of Taiwan application serial no. 112148835, filed on Dec. 14, 2023. The entirety of the above-mentioned patent application is hereby incorporated by reference herein and made a part of this specification.

BACKGROUND

Field of the Disclosure

The present disclosure relates to a display system, and in particular to a side window display system on vehicles.

Description of Related Art

When vehicle continues moving, the scenery outside the window is also constantly changing. The side windows of a car cockpit generally adopts transparent glass to block interference from the outside. Apart from that, it seems difficult to utilize the flat space of the side windows of the car cockpit in any other ways, such as being combined with external environment to generate interaction. Moreover, safety warnings of vehicles are mostly provided through sounds, lights, or warning messages displayed on the instrument panel, but the warning effect is not good for passengers in the vehicle besides the driver. In view of the foregoing, if it is possible to display information through the side window, it might be possible to effectively improve the applicability and safety of the vehicle.

SUMMARY OF THE DISCLOSURE

The present disclosure provides a side window display system on vehicles. By disposing a transparent display on the side window of the vehicle, and disposing a sensor inside and outside the vehicle to provide environment information inside and outside the vehicle, it is possible to allow passengers to have virtual and real interactive experience with the image outside the window, thereby enhancing immersive experience and improving applicability of vehicles. In addition, the warning content may be presented on the transparent display of the car window to provide a more intuitive warning effect to improve safety of the vehicle.

In the disclosure, a side window display system on vehicles includes a transparent display, at least one external sensor, at least one internal sensor and a controller. The transparent display is disposed on a side window of a vehicle. The external sensor is disposed to detect an external environment of the vehicle to provide external environment information. The internal sensor is disposed to detect an internal environment of the vehicle to provide internal environment information. The controller is coupled to the transparent display, the external sensor, and the internal sensor to select an operation mode based on the internal environment information, and controls the transparency distribution and brightness distribution of the transparent display based on the operation mode and the external environment information.

Based on the above, in the vehicle side window display system of the embodiment of the present disclosure, through the sensors disposed inside and outside the vehicle, the controller may sense the current environment information inside and outside the vehicle to control the transparent display to perform corresponding transparency adjustment and brightness adjustment. In this way, it is possible to provide an environment for passengers to have a virtual and real interaction with the images outside the window, thereby enhancing the immersive experience and improving applicability of the vehicle.

In order to make the above-mentioned features and advantages of the present disclosure more obvious and easy to understand, embodiments are given below and are described in detail below with reference to the accompanying drawings.

DESCRIPTION OF EMBODIMENTS

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

It should be understood that the terms "first," "second," and "third" may be used to describe different elements, components, areas, layers and/or portions in the disclosure, but these elements, components, areas, layers and/or portions should not be limited by these terms. These terms are only used to distinguish the elements, components, areas, layer and/or portions from one another. Therefore, "first elements," "components," "areas," "layers" and/or "portions" may be referred to as second elements, components, areas, layers and/or portions without departing from the scope of the inventive concept.

The term used herein is for the purpose of describing particular embodiments and is not particularly limited. The articles "a," "an," and "the" are intended to include the plural forms and "at least one" as well, unless the context clearly indicates otherwise. Unless otherwise indicated, "or" means "and/or". As used herein, the term "and/or" includes any one and any combination of any two or more of the associated listed items. It is also to be understood that the terms "comprises," "includes," and "has" specify the presence of stated features, regions, steps, operations, elements, components, and/or combinations thereof, but the existence or addition of one or more other features, regions, steps, operations, elements, components, and/or combinations thereof are not excluded.

Figure 1A:
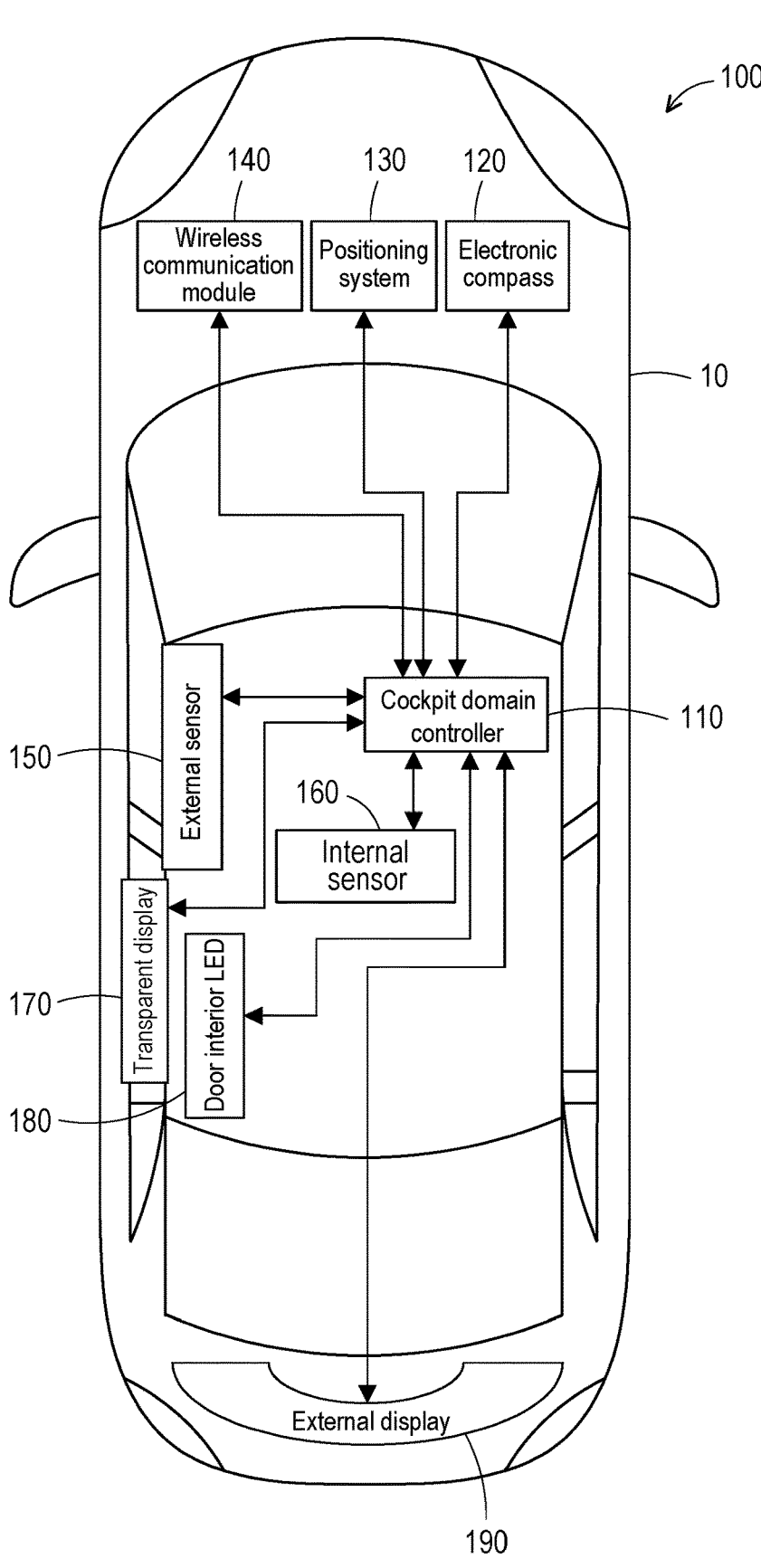
FIG. 1A is a schematic configuration diagram of a side window display system on vehicles according to an embodiment of the present disclosure.
Figure 1B:
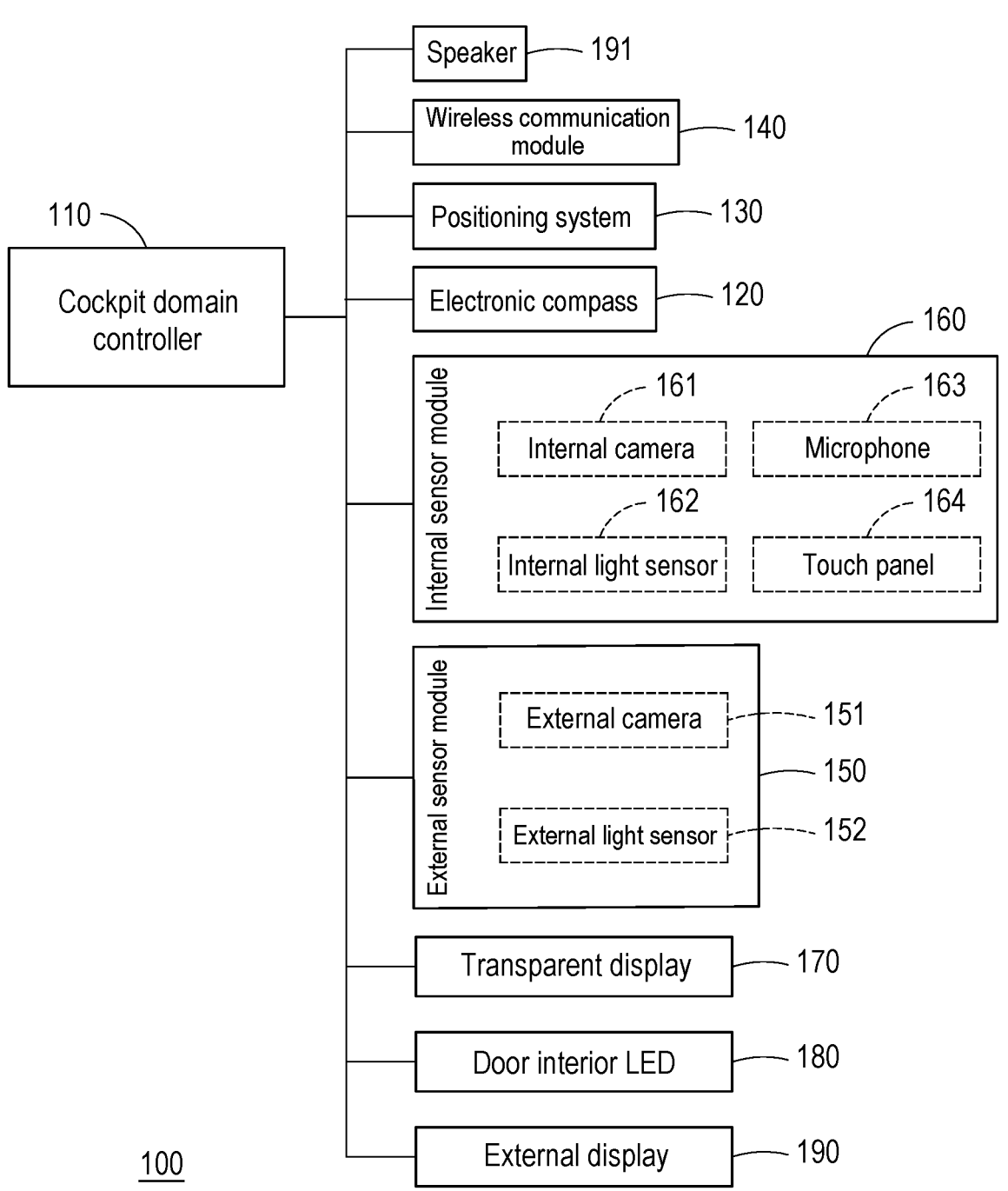
FIG. 1B is a system schematic diagram of a side window display system on vehicles according to an embodiment of the present disclosure.

FIG. 1A is a schematic configuration diagram of a side window display system on vehicles according to an embodiment of the present disclosure. FIG. 1B is a system schematic diagram of a side window display system on vehicles according to an embodiment of the present disclosure. Please refer to FIG. 1A and FIG. 1B. In this embodiment, the vehicle side window display system 100 may be applied to (or disposed in) the vehicle 10, and the vehicle side window display system 100 includes, for example, a cockpit domain controller (CDC) 110, an electronic compass 120, a positioning system 130, a wireless communication module 140, at least one external sensor 150, at least one internal sensor 160, a transparent display 170, a door interior light-emitting diode (LED) 180, an external display 190, and a speaker 191. The cockpit domain controller 110 is coupled to the electronic compass 120, the positioning system 130, the wireless communication module 140, at least one external sensor 150, and at least one internal sensor 160, the transparent display 170, the door interior LED 180, the external display 190, and the speaker 191.

The transparent display 170 may be disposed on a side window of a vehicle, for example, may be attached on the glass on the inner side of the side window of the vehicle or integrated with the side window of the vehicle so that passengers in the vehicle 10 are able to watch the transparent display 170. At least one external sensor 150 is disposed to detect the external environment of the vehicle 10 to provide external environment information (such as light brightness and/or images of external environment). At least one internal sensor 160 is disposed to detect the internal environment of the vehicle 10 to provide internal environment information (e.g., light brightness of internal environment, passenger voice and/or passenger images). The cockpit domain controller 110 selects an operation mode based on the internal environment information, and controls the transparency distribution (that is, the transparency of each pixel in the transparent display 170) and the brightness distribution (that is, the brightness of each pixel in the transparent display 170) of the transparent display 170 based on the operation mode and the external environment information.

Based on the above, by arranging sensors inside and outside the vehicle, the cockpit domain controller 110 may sense the current environment information inside and outside the vehicle to control the transparent display 170 to perform corresponding transparency adjustment and brightness adjustment, thereby providing passengers with an environment for the passengers to have virtual and real interactions with the images outside the window, thereby enhancing the immersive experience and improving applicability of the vehicle.

In an embodiment of the present disclosure, the cockpit domain controller 110 may be implemented through a computer on wheels, an on-board computer, or an electronic control unit (ECU). The positioning system 130 may be implemented through a Global Positioning System (GPS). The wireless communication module 140 may be implemented through vehicle-to-everything (V2X), $3^{rd}$ generation of mobile phone mobile communication technology standards (3G), $4^{th}$ generation of mobile phone mobile communication technology standards (4G), 4.5G and/or $5^{th}$ generation of mobile phone mobile communication technology standards (5G), but the embodiment of the present disclosure is not limited thereto.

At least one external sensor 150 may include, but is not limited to, an external camera 151 and an external light sensor 152. At least one internal sensor 160 may include, but is not limited to, an internal camera 161 (e.g., an infrared (IR) camera), an internal light sensor 162, a microphone 163, and a touch panel 164.

In an embodiment of the present disclosure, the transparent display 170 is, for example, a micro light-emitting diode display, but the embodiment of the present disclosure is not limited thereto.

In an embodiment of the present disclosure, the internal camera 161 may detect the angle of view of the passenger's eyes and body posture. Furthermore, through the Passenger Monitor System (PMS), the internal camera 161 may detect whether there are people on the seat, head angle, facial landmarks, eye opening/closing, and mouth opening/closing, and determine whether the passenger is dozing off, looking aside, etc. Through gaze tracking, the internal camera 161 may detect changes in the passenger's eyeballs and head angles, thereby identifying target of interest (TOI) and determining the passenger's intention to get off the vehicle. The internal camera 161 may detect the passenger's body movements through gesture recognition, thereby controlling the screen display and determining the passenger's intention to get off the vehicle.

In an embodiment of the present disclosure, the external camera 151 may detect the external environment images outside the vehicle 10. Furthermore, through object detection, the external camera 151 may detect objects in external environment, thereby providing a list of possible TOI and detecting the distance to the approaching car behind the door opening side. Through edge detection, the external camera 151 may detect the contour of objects in external environment to achieve the purpose of virtual and real integration.

In an embodiment of the present disclosure, the microphone 163 may detect the passenger's voice signal. Furthermore, through speech recognition, the microphone 163 may convert the passenger's voice commands into text. Through speech recognition and text to speech functions, the microphone 163 may be used with the speaker 191 to implement a voice assistant function.

In an embodiment of the present disclosure, the touch panel 164 may detect the passenger's touch or press on the transparent display 170.

Figure 2:
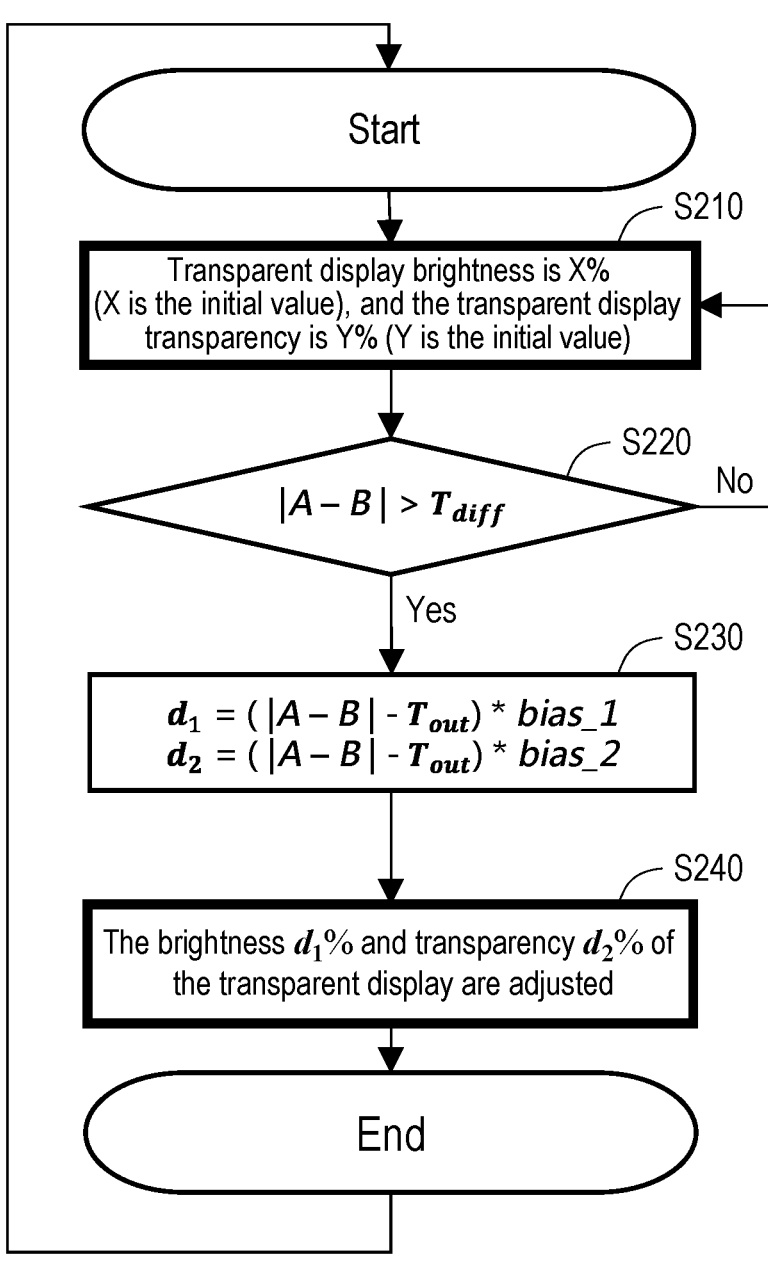
FIG. 2 is a flow chart of a brightness adjustment mode of a side window display system on vehicles according to an embodiment of the present disclosure.

FIG. 2 is a flow chart of a brightness adjustment mode of a side window display system on vehicles according to an embodiment of the present disclosure. Please refer to FIG. 1A, FIG. 1B and FIG. 2. In this embodiment, the brightness adjustment mode may be executed permanently, that is, executed anytime and anywhere. In the brightness adjustment mode, the vehicle side window display system 100 may use the external light sensor 152 to detect the light brightness of external environment (or external light brightness) outside the vehicle 10, and use the internal light sensor 162 to detect the internal light brightness inside the vehicle 10. Then, the vehicle side window display system 100 may execute and utilize corresponding calculations (such as adjusting brightness and transparency logic) to control the transparency distribution and brightness distribution of the transparent display 170 based on the brightness errors of the internal brightness and external brightness. For example, when the brightness inside the vehicle and the brightness outside the vehicle are different, the vehicle side window display system 100 may automatically adjust the brightness and transparency of the transparent display 170.

Furthermore, the brightness adjustment mode may involve the following steps. In step S210, the transparent display brightness is X % (X is the initial value), and the transparent display transparency is Y % (Y is the initial value). In step S220, it is determined whether $|A-B|$ is greater than $T_{diff}$, wherein A is the value of the light brightness of external environment, B is the value of the brightness inside the vehicle 10, and $T_{diff}$ is the internal and external brightness difference threshold. When $|A-B|$ is not greater than $T_{diff}$, it means that the difference in light brightness of the internal and external environments is small and does not affect the passenger's viewing. Therefore, the brightness and transparency of the transparent display 170 do not need to be adjusted (that is, return to step S210); conversely, when $|A-B|$ is greater than $T_{diff}$, it means that the difference in light brightness of the internal and external environments too large, which might affect the passenger's viewing. Therefore, the brightness and transparency of the transparent display 170 need to be adjusted (i.e., step S230 is performed).

In step S230, parameters $d_1$ and $d_2$ for adjusting the brightness and transparency of the transparent display 170 may be determined, wherein $d_1 = (|A-B|-T_{out})*bias\_1$, $d_2 = (|A-B|-T_{out})*bias\_2$. Tout is the light brightness threshold of the external environment, $d_1$ is the dimming brightness ratio of the internal and external brightness difference, bias\_1 is the dimming weight of the internal and external brightness difference, $d_2$ is the adjusted transparency ratio of the internal and external brightness difference, and bias\_2 is the adjustment transparency weight for internal and external brightness difference.

In step S240, the brightness $d_1$% and transparency $d_2$% of the transparent display 170 may be adjusted. In the embodiment of the present disclosure, when A>B (that is, the external light is brighter), the brightness of the transparent display 170 may be increased (for example, set to $X+d_1$%), and the transparency of the display may be reduced (for example, set to $Y-d_2$%); conversely, when A>B (that is, the internal light is brighter), the brightness of the transparent display 170 may be reduced (for example, set to $X-d_1$%), and the transparency of the display may be increased (for example, set to $Y+d_2$%).

Figure 3:
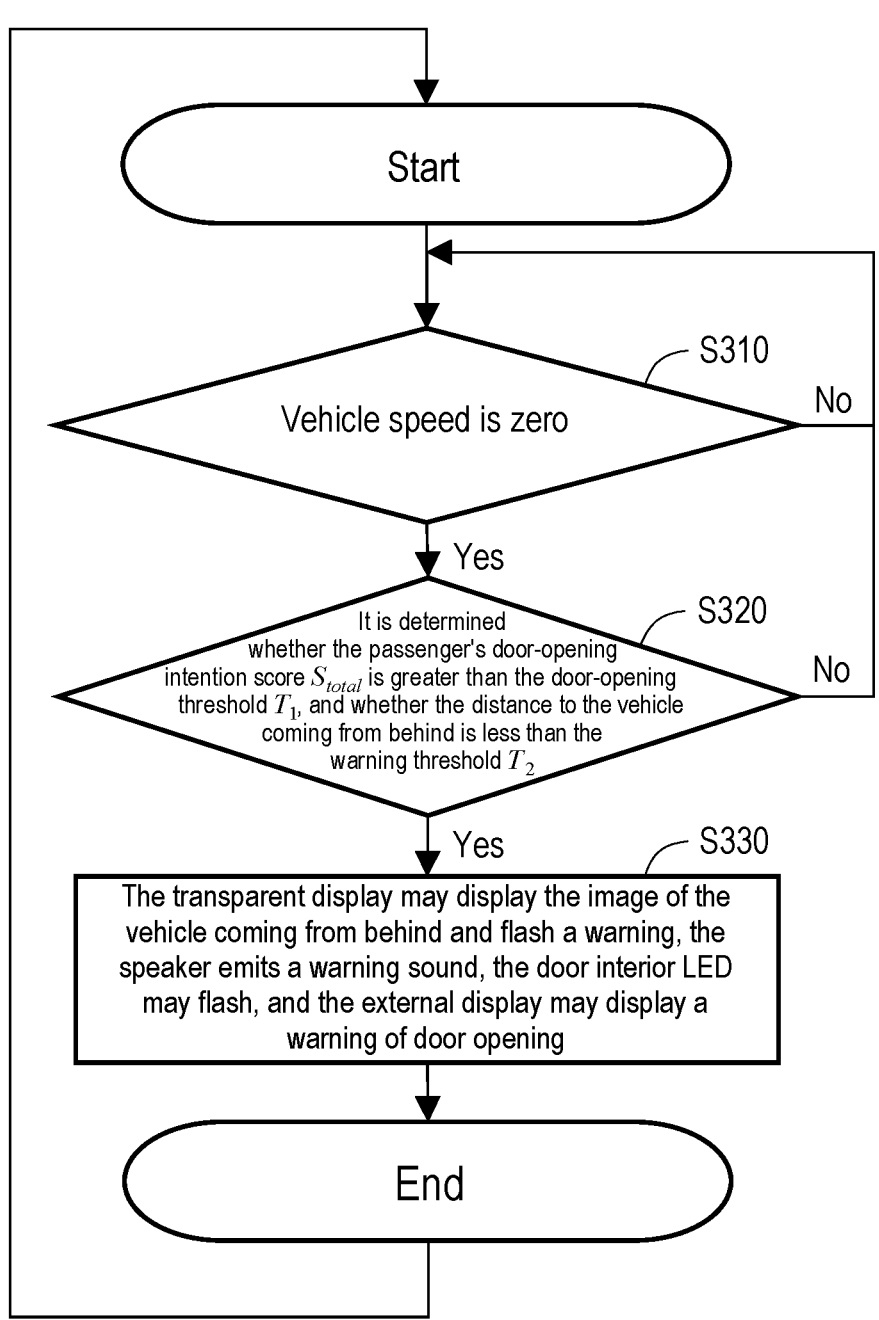
FIG. 3 is a flow chart of a parking warning mode of the side window display system on vehicles according to an embodiment of the present disclosure.

FIG. 3 is a flow chart of a parking warning mode of the side window display system on vehicles according to an embodiment of the present disclosure. Please refer to FIG. 1A, FIG. 1B and FIG. 3. In this embodiment, the parking warning mode may be executed permanently, that is, executed anytime and anywhere. In the parking warning mode, the vehicle side window display system 100 may use the internal camera 161 to recognize the passenger's gaze and body movements, and use the external camera 151 to detect vehicles coming from behind. Then, when the vehicle is parked, the cockpit domain controller 110 of the vehicle side window display system 100 may execute and use corresponding calculations (such as passenger monitoring system (PMS) and object detection) to determine whether the passenger is to open the door and determine whether there is an approaching vehicle behind the vehicle, and thereby controlling the transparency distribution and brightness distribution of the transparent display 170. That is to say, when a passenger gets off the car and there is a car coming from behind, a warning message for warning of an approaching car may be provided to the passenger, and a warning message for warning of the passenger getting off the car to open the door may be provided to the car coming from behind. Moreover, as the distance to the vehicle coming from behind gets closer, the warning provided may be more noticeable.

The following steps may be performed in the brightness adjustment mode. In step S310, it will be determined whether the vehicle speed is zero (that is, =0), that is, to determine whether the vehicle has stopped, wherein the vehicle speed information may be provided by the vehicle 10 or calculated by the vehicle side window display system 100 through the position information provided by the positioning system 130. When the vehicle has not stopped, step S310 will continue to be executed; when the vehicle has stopped, step S320 will be executed to determine whether to provide a door opening warning. In step S320, it will be determined whether the passenger's door-opening intention score $S_{total}$ is greater than the door-opening threshold $T_1$, and whether the distance to the vehicle coming from behind is less than the warning threshold $T_2$. In an embodiment of the present disclosure, the door-opening intention score $S_{total}$ may be divided into four parts for evaluation (such as the passenger's gaze area, the passenger's face angle, the turning angle of passenger's body, and the distance between the passenger's hand and the door handle), and the scores of the four parts may be directly summed or a weighted sum may be used, which may be determined according to the system design, and the embodiment of the present disclosure is not limited thereto. The passenger's gaze area and the passenger's face angle may be recognized through the passenger monitoring system. The turning angle of the passenger's body and the distance between the passenger's hand and the door handle may be recognized through posture detect, and the distance to the approaching vehicle coming from behind may be recognized through object detection.

When the passenger's door-opening intention score $S_{total}$ is not greater than the door-opening threshold $T_1$ and/or the distance to the approaching car from behind is not less than the warning threshold $T_2$, then return to step S310. When the passenger's door-opening intention score $S_{total}$ is greater than the door-opening threshold $T_1$ and when the distance to the approaching vehicle coming from behind is less than the warning threshold $T_2$, step S330 is executed to provide a warning of door opening. In step S330, the transparent display 170 may display the image of the vehicle coming from behind and flash a warning, the speaker 191 may emit a warning sound, the door interior LED 180 may flash, and the external display 190 may display a warning of door opening (such as text or pictures).

In the embodiment of the present disclosure, when the distance to the vehicle coming from behind is closer, the warning displayed on the transparent display 170 becomes more noticeable. For example, when the distance to the vehicle coming from behind is closer, the image of the vehicle coming from behind may be changed from small to large on the transparent display 170, and the transparency of the corresponding display area may be reduced to make the image of the vehicle coming from behind more noticeable.

Figure 4:
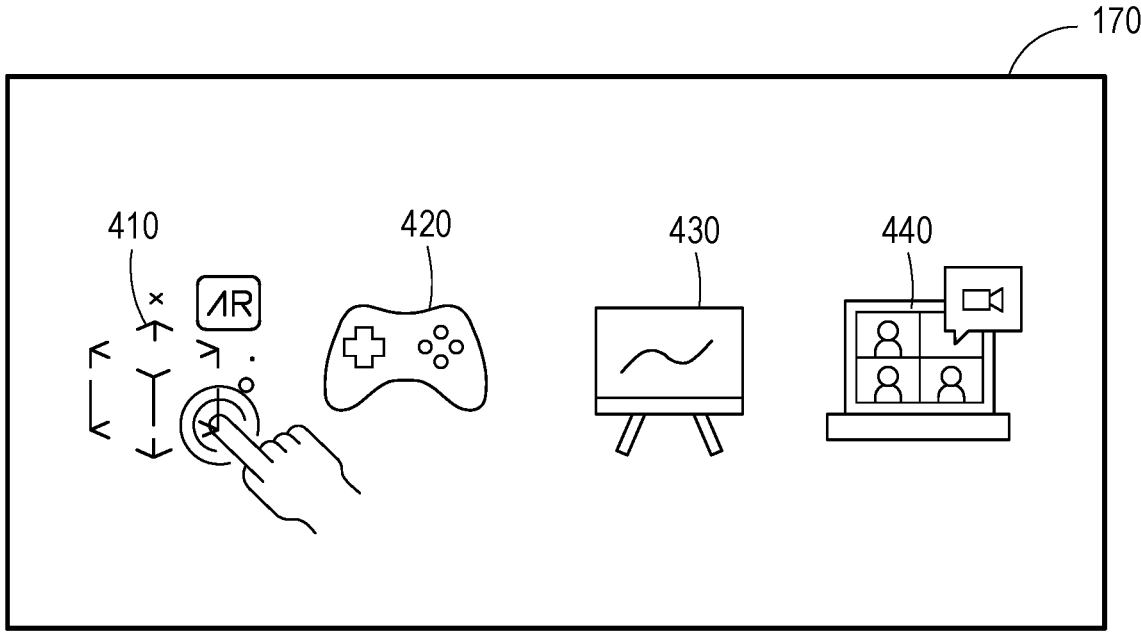
FIG. 4 is a schematic diagram showing an operation diagram of a side window display system on vehicles according to an embodiment of the present disclosure.

FIG. 4 is a schematic diagram showing an operation diagram of a side window display system on vehicles according to an embodiment of the present disclosure. Please refer to FIG. 1A, FIG. 1B and FIG. 4. In this embodiment, apart from the parking warning mode and brightness adjustment mode that are permanently executed as shown in FIG. 2 and FIG. 3, there are also application modes selected by passengers. In this embodiment, the transparent display 170 may display, for example, an augmented reality (AR) navigation mode icon 410, a game mode icon 420, an electronic whiteboard mode icon 430, and a video conference mode icon 440. Moreover, the passenger may select the desired application mode through touch, that is, the cockpit domain controller 110 may select the operation mode based on one of the plurality of operation icons touched by the passenger.

Figure 5A:
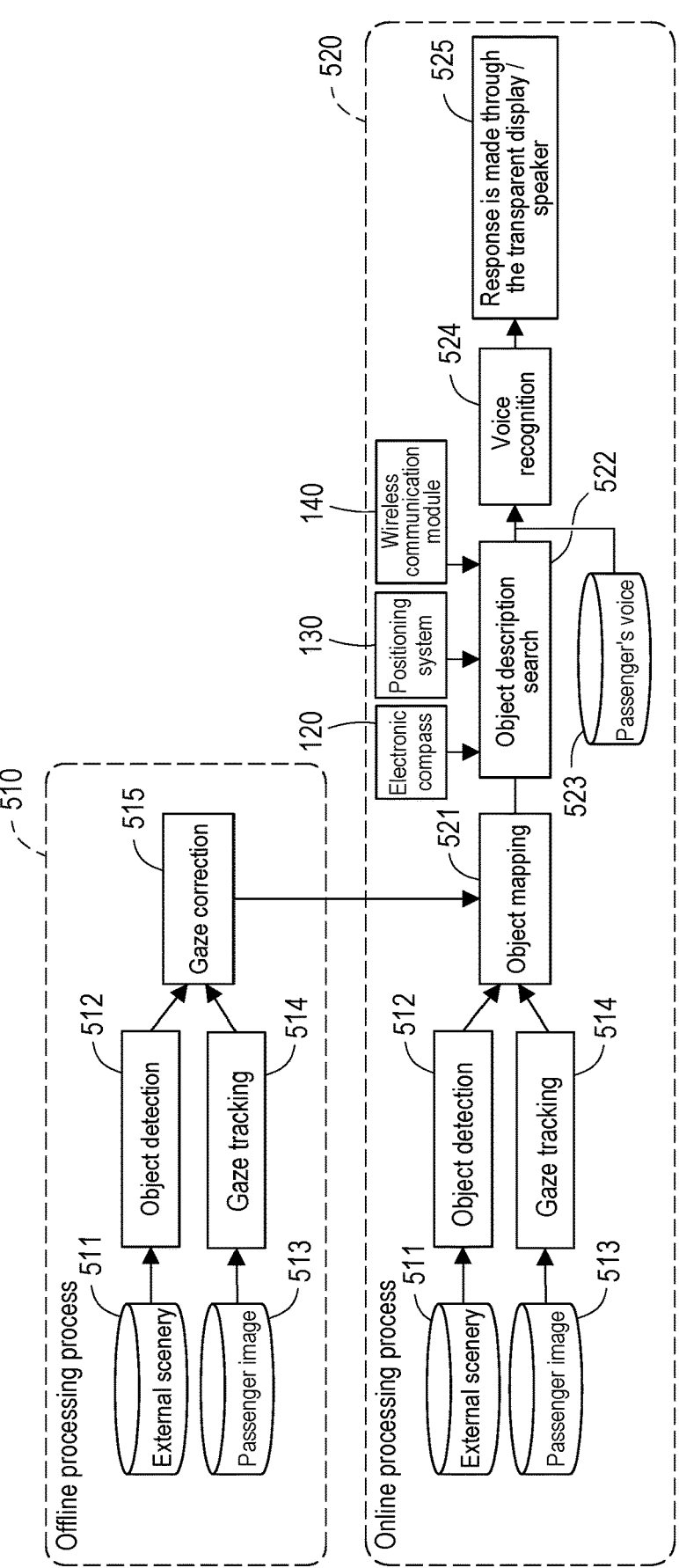
FIG. 5A is a schematic diagram showing a process flow of an AR navigation algorithm of a side window display system on vehicles according to an embodiment of the present disclosure.

FIG. 5A is a schematic diagram showing a process flow of an AR navigation algorithm of a side window display system on vehicles according to an embodiment of the present disclosure. Please refer to FIG. 1A, FIG. 1B and FIG. 5A. In this embodiment, the AR navigation algorithm includes two parts: an offline processing process 510 and an online processing process 520. In the offline processing process, the image captured from the external environment needs to be corrected with the human's gaze. Furthermore, object detection 512 may be performed on the external scenery 511, and gaze tracking 514 may be performed on the passenger image 513. Then, gaze correction 515 is performed based on the results of object detection 512 and gaze tracking 514. Among the above, object detection 512 is adopted to detect objects outside the car window.

In the online processing process 520, with the corrected model generated by the offline processing process 510, the TOI corresponding to the external environment objects may be mapped according to the eyeball and face angles. Furthermore, in addition to performing object detection 512 on the external scenery 511 and performing gaze tracking 514 on the passenger image 513, object mapping 521 may be performed to map the passenger's gaze and the detected objects outside the car window. Then, the position of the object (that is, the TOI) mapped by the passenger is determined through the position information provided by the electronic compass 120, the angle of the passenger's gaze, and the positioning information provided by the positioning system 130, and connected to the cloud system through the wireless communication module 140, so as to perform object description search 522 through the cloud system, thereby searching for object information of TOI. Then, when the microphone 163 receives the voice command conveyed by the passenger's voice 523, the voice recognition 524 may be performed on the passenger's voice 523 to determine whether the passenger's voice 523 conveys the voice command. When the voice command conveyed by the passenger's voice 523 is related to the TOI, a response 525 is made through the transparent display/speaker, such as displaying text information through the transparent display 170 and/or a text-to-speech algorithm to convert the object information of the TOI into voice to play the information through the speaker 191. Among the above, the position information provided by the electronic compass 120 and the positioning information provided by the positioning system 130 may be used to filter the searched content to improve search accuracy.

Figure 5B:
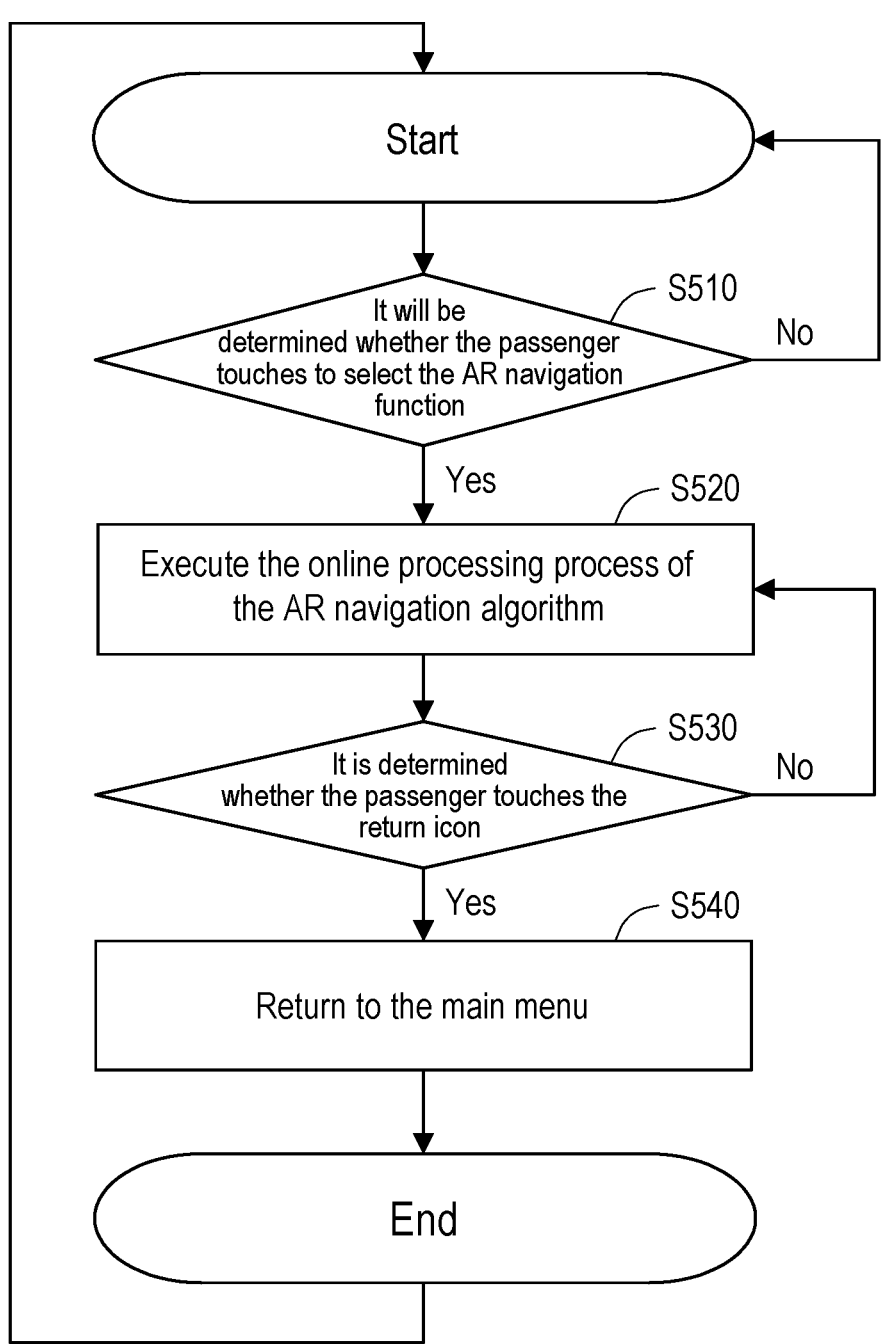
FIG. 5B is a flow chart of the AR navigation mode of the side window display system on vehicles according to an embodiment of the present disclosure.

FIG. 5B is a flow chart of the AR navigation mode of the side window display system on vehicles according to an embodiment of the present disclosure. Please refer to FIG. 1A, FIG. 1B, FIG. 4, FIG. 5A and FIG. 5B. In this embodiment, when the passenger touches the augmented reality navigation mode icon 410 on the transparent display 170, the vehicle side window display system 100 may can enter the augmented reality navigation mode. Under the circumstances, when the passenger looks out the window, the vehicle side window display system 100 may find the TOI information and put the TOI information on the transparent display 170, or the passenger may capture the (image) of TOI and combine the image of TOI with the face captured by the internal camera 161 in the car to perform image reconstruction/composition.

Furthermore, in step S510, it will be determined whether the passenger touches to select the AR navigation function. When the passenger does not touch to select the AR navigation function, the process will start again; when the passenger touches to select the AR navigation function, step S520 is executed to execute the online processing process of the AR navigation algorithm. Next, in step S530, it is determined whether the passenger touches the return icon (e.g., return icon 546a in FIG. 5E). When the passenger does not touch the return icon, the execution of the AR navigation algorithm is maintained; when the passenger touches the return icon, step S540 is executed to return to the main menu (as shown in FIG. 4).

Figure 5C:
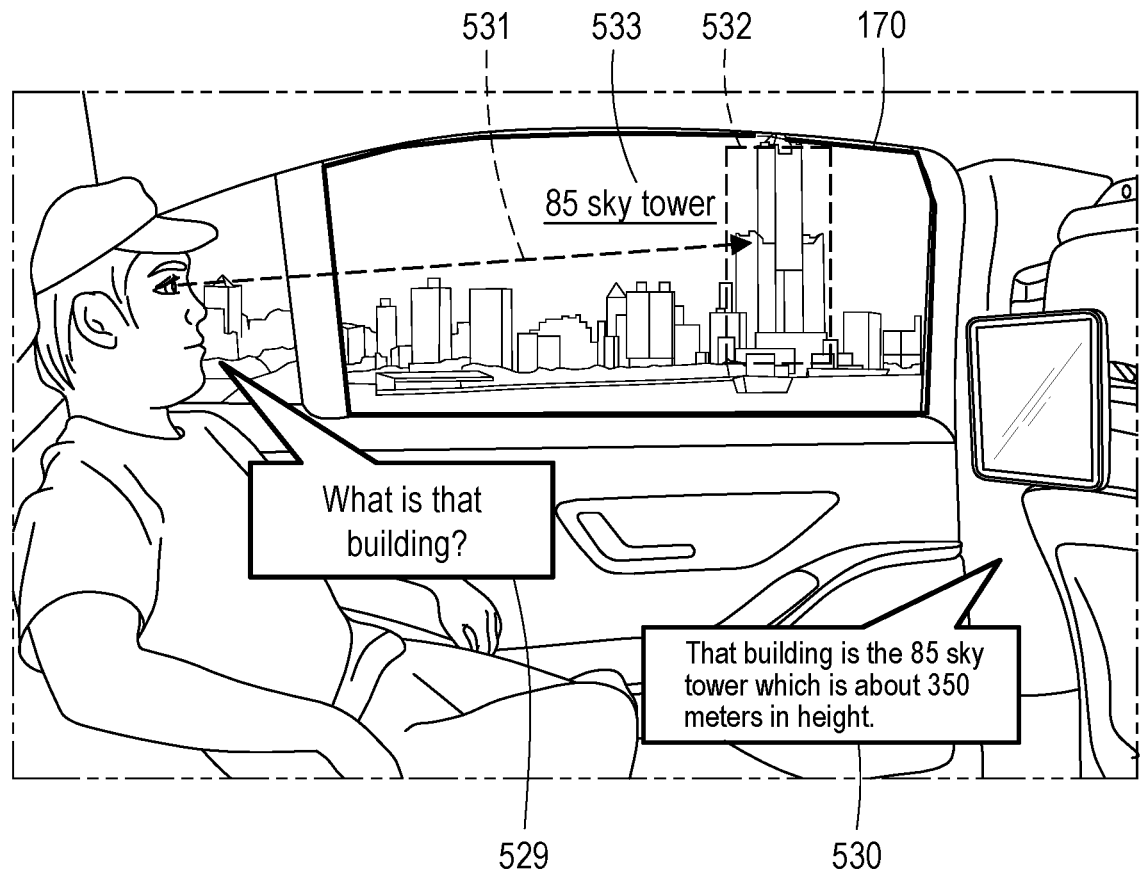
FIG. 5C is a schematic diagram showing the AR navigation mode of the side window display system on vehicles according to an embodiment of the present disclosure.
Figure 5D:
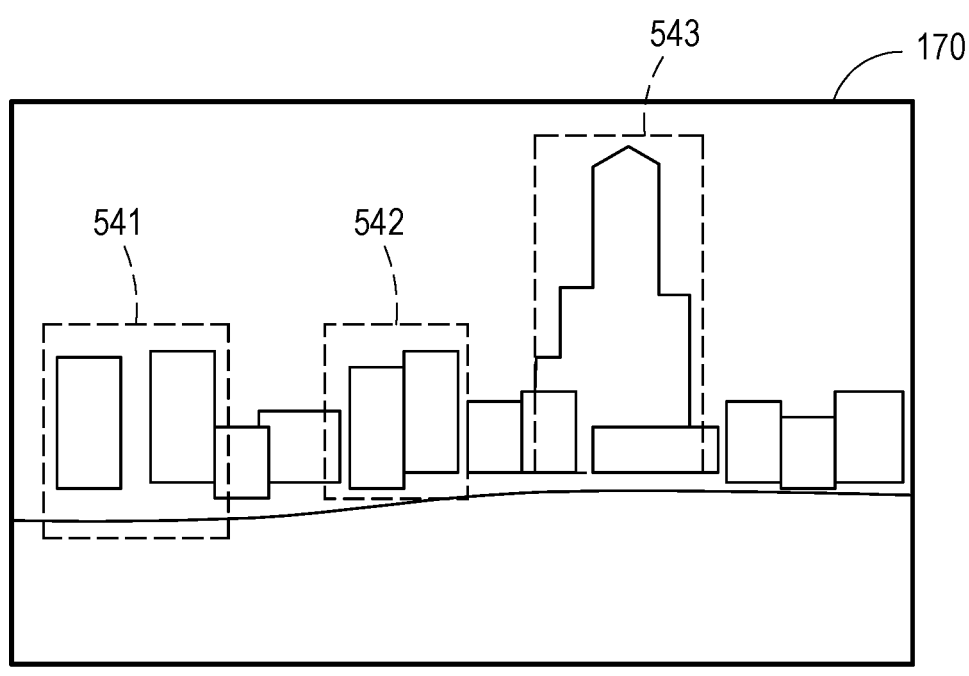
FIG. 5D to FIG. 5G are schematic diagrams showing operations in the AR navigation mode of the side window display system on vehicles according to an embodiment of the present disclosure.
Figure 5E:
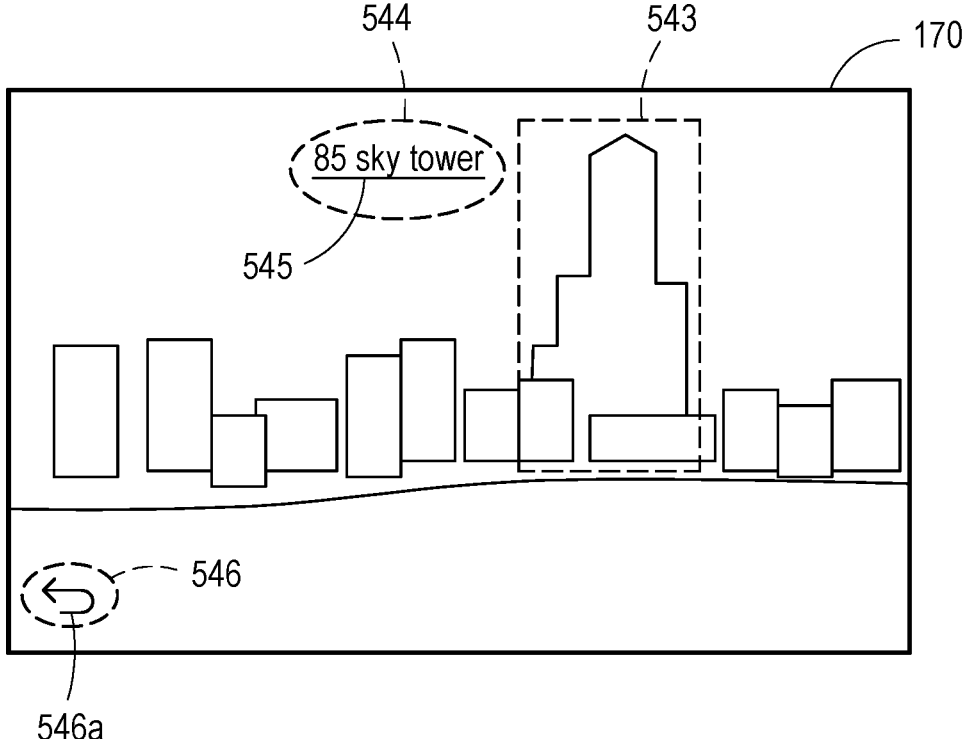

FIG. 5C is a schematic diagram showing the AR navigation mode of the side window display system on vehicles according to an embodiment of the present disclosure. FIG. 5D to FIG. 5G are schematic diagrams showing operations in the AR navigation mode of the side window display system on vehicles according to an embodiment of the present disclosure. Please refer to FIG. 1A, FIG. 1B, FIG. 4, FIG. 5A to FIG. 5G. In this embodiment, when entering the augmented reality navigation mode, the vehicle side window display system 100 utilizes an object detection algorithm to detect the object (marked by the frames 541 to 543 in FIG. 5D) in the scenery outside the window. Then, the passenger's TOI 532 (that is, the object marked by the frame 543)

may be found according to the passenger's gaze 531. When receiving the passenger's voice command 529, in addition to displaying the text information 533 on the transparent display 170, the voice information 530 may also be played through the speaker 191. As shown in FIG. 5E, the transparency of the area 544 displaying the text information 545 may be reduced and/or the transparency of the area 546 displaying the return icon 546a may be reduced, so that the text information 545 and the return icon 546a are more noticeable to passengers. In other words, the cockpit domain controller 110 may control the transparency distribution and brightness distribution of the transparent display 170, so that the transparency of at least one area on the transparent display 170 that displays text and/or icons is reduced.

Figure 5F:
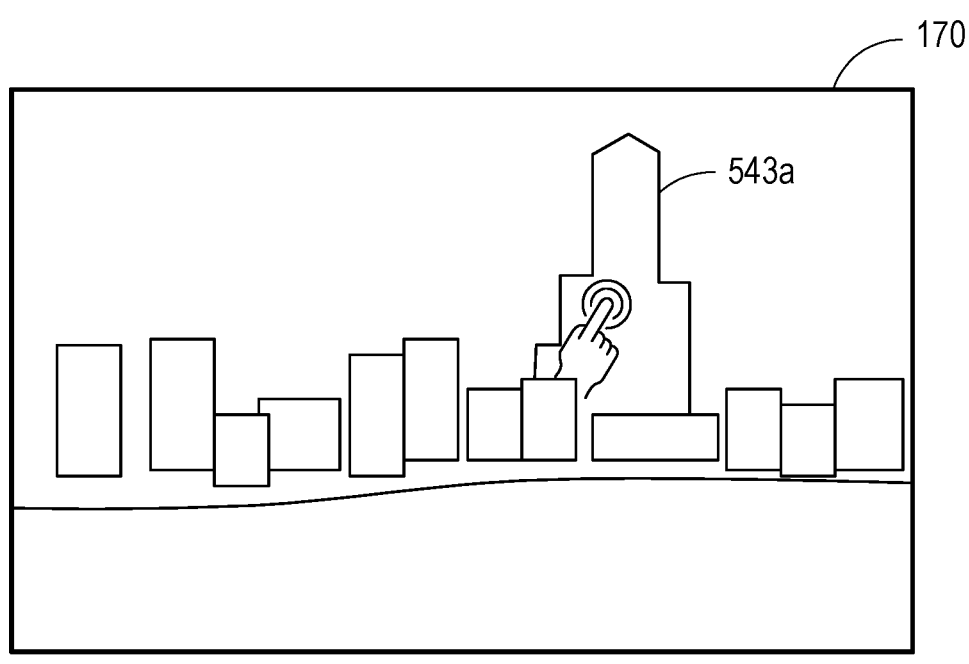
Figure 5G:
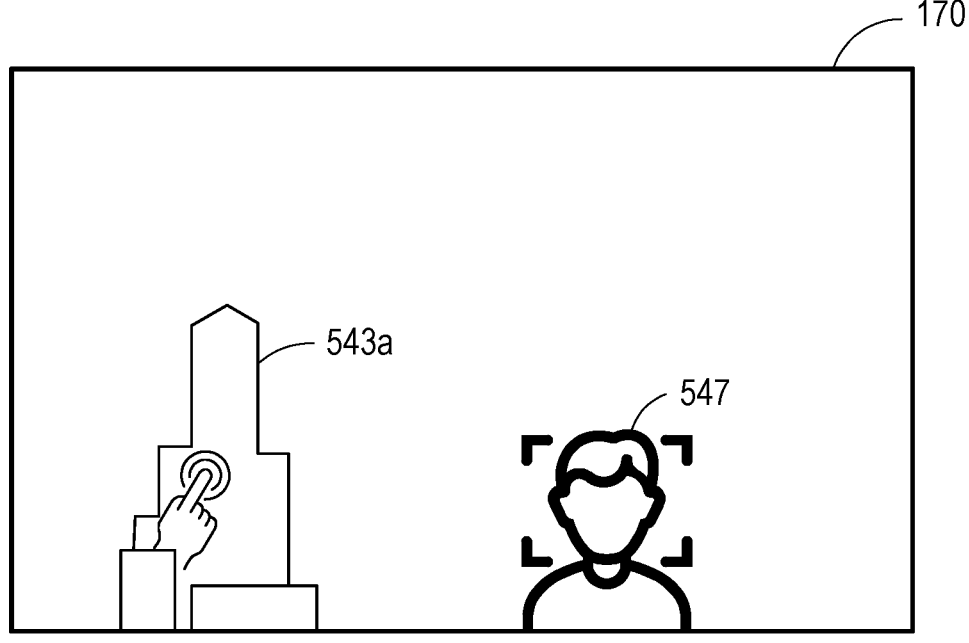

As shown in FIG. 5F and FIG. 5G, when the passenger continues to press the object 543a in the TOI 543, the object 543a may be dragged. When the object 543a is dragged, the overall transparency of the transparent display 170 may be reduced so that the dragged object 543a may be clearly displayed and moved. Moreover, the passenger may select the portrait 547 or other objects to be displayed on the transparent display 170. When the object 543a is pressed, an operation menu may appear so that the image of the object 543a may be dragged, copied, stored, etc., which may be determined based on the system design, and the embodiment of the present disclosure is not limited thereto.

According to the above, the cockpit domain controller 110 detects the TOI corresponding to the passenger in the external environment image based on the voice recognition result of the passenger's voice signal, and determines the projection position of the TOI on the transparent display 170 based on the passenger's perspective. Then, the cockpit domain controller 110 controls the transparency distribution and brightness distribution of the transparent display 170 to mark the projection position on the transparent display 170. Furthermore, the cockpit domain controller 110 further controls the transparency distribution and brightness distribution of the transparent display 170 to display the TOI information next to the projection position on the transparent display 170.

In an embodiment of the present disclosure, the cockpit domain controller 110 may drag one of these operation icons, a game icon, or a TOI area in the external image on the transparent display 170 based on the passenger's pressing.

Figure 5H:
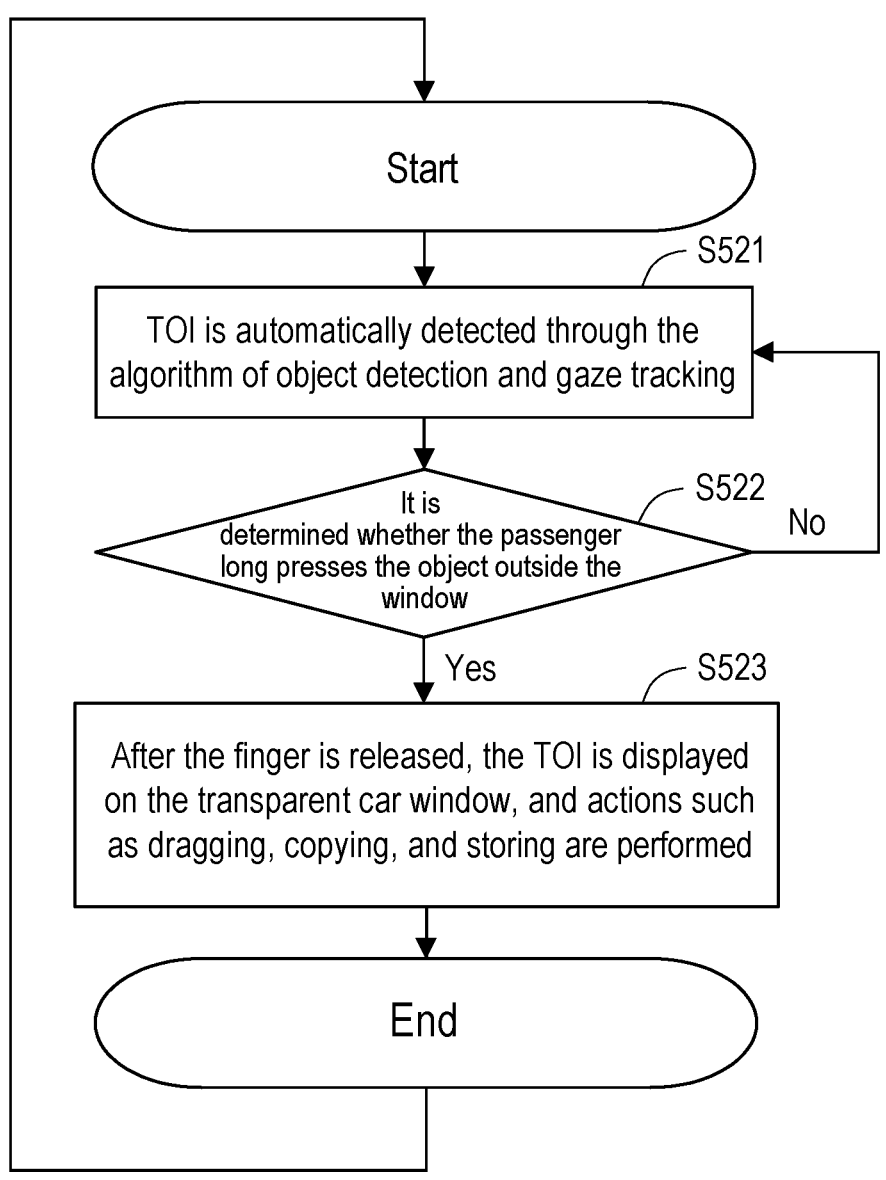
FIG. 5H is a flow chart of an online processing process of the AR navigation algorithm of the side window display system on vehicles according to an embodiment of the present disclosure.

FIG. 5H is a flow chart of an online processing process of the AR navigation algorithm of the side window display system on vehicles according to an embodiment of the present disclosure. Please refer to FIG. 1A, FIG. 1B, FIG. 5A, FIG. 5B and FIG. 5H. In this embodiment, the online processing process of the AR navigation algorithm may involve the following steps. In step S521, the TOI may be automatically detected through the algorithm of object detection and gaze tracking. In step S522, it is determined whether the passenger long presses the object outside the window. When the passenger does not long press the object outside the window, return to step S521; when the passenger long presses the object outside the window, perform step S523. In step S523, after the finger is released, the TOI is displayed on the transparent car window, and actions such as dragging, copying, and storing may be performed.

Figure 6A:
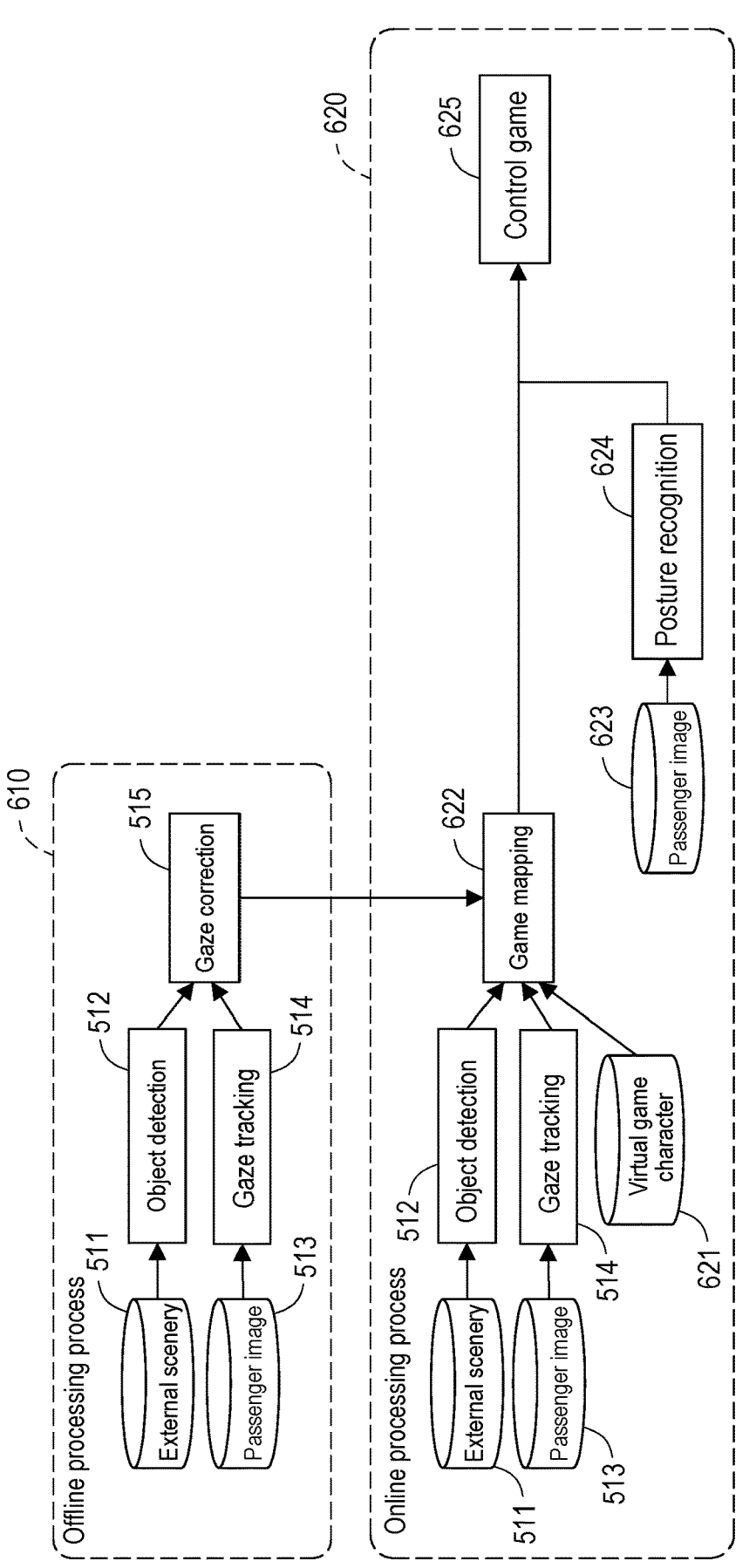
FIG. 6A is a schematic diagram showing a process flow of a game algorithm of a side window display system on vehicles according to an embodiment of the present disclosure.

FIG. 6A is a schematic diagram showing a process flow of a game algorithm of a side window display system on vehicles according to an embodiment of the present disclosure. Please refer to FIG. 1A, FIG. 1B, FIG. 5A and FIG. 6A. In this embodiment, the game algorithm includes two parts: an offline processing process 610 and an online processing process 620. Description of the offline processing process 610 may be derived from the offline processing process 510 in the AR navigation algorithm shown in FIG. 5A, and details will not be repeated here.

In the online processing process 620, with the corrected model generated by the offline processing process 610, the game screen may be mapped to the external environment and the virtual game character according to the eyeball and face angles. Furthermore, in addition to object detection 512 of the external scenery 511 and gaze tracking 514 of the passenger image 513, game mapping 622 may be performed to map the passenger's gaze, the detected objects outside the car window, and the virtual game character 621 to project the game screen. After the game screen is projected, posture recognition 624 will be performed on the passenger image 623 to recognize the passenger's body movements. Then, the game 620 may be controlled through the passenger's body movements, gaze and/or touch to control the movements of the game characters.

Figure 6B:
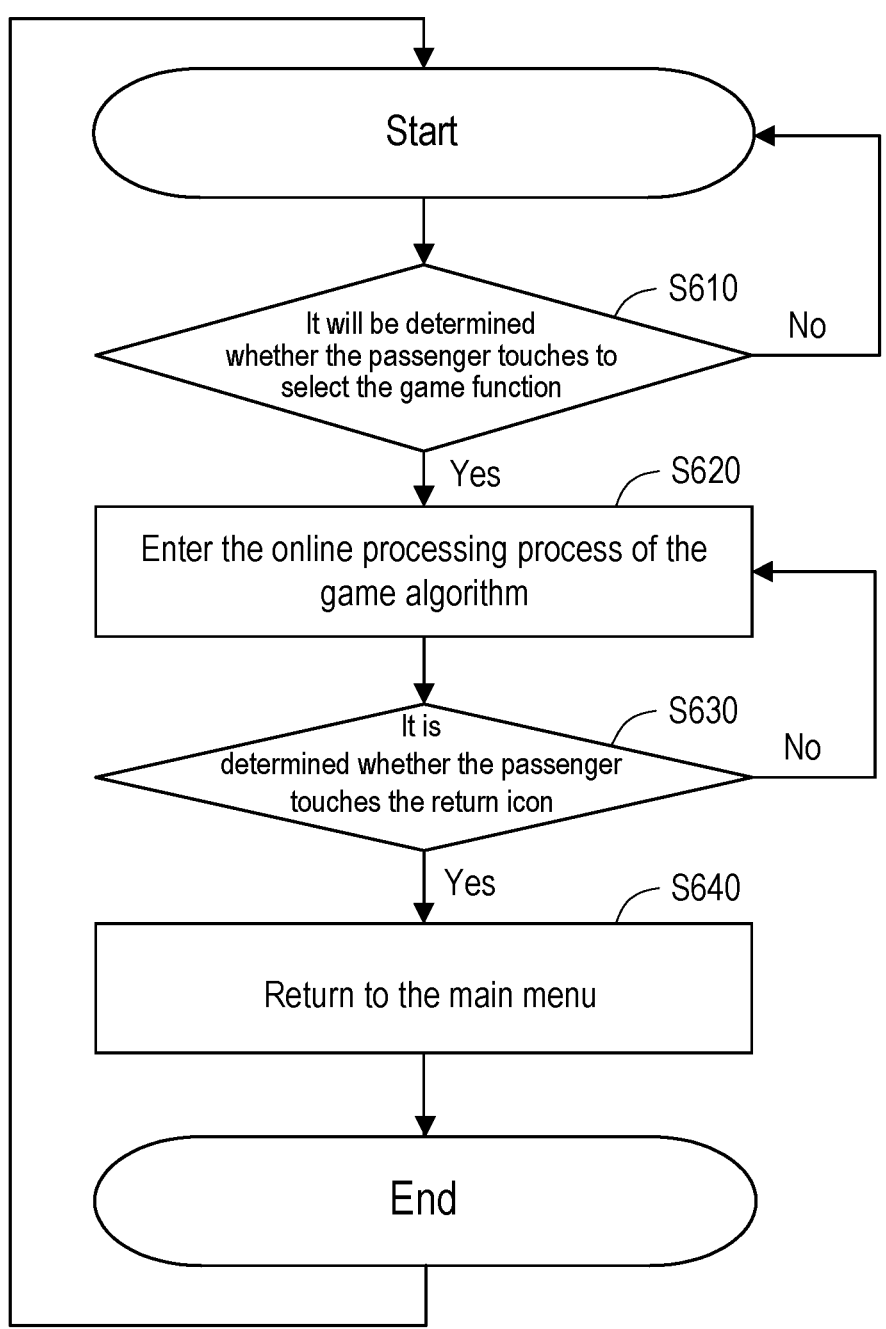
FIG. 6B is a flow chart of a game mode of a side window display system on vehicles according to an embodiment of the present disclosure.

FIG. 6B is a flow chart of a game mode of a side window display system on vehicles according to an embodiment of the present disclosure. Please refer to FIG. 1A, FIG. 1B, FIG. 4, FIG. 6A and FIG. 6B. In this embodiment, the passenger touches the game mode icon 420 on the transparent display 170, the vehicle side window display system 100 may enter the game mode. In other words, when passengers want some entertainment, they may use the external camera 151 to capture the scenery outside the window, detect passenger's gaze and gesture recognition through the internal camera 161, and combine the virtual game character with the scenery outside the window to achieve integrated virtual and real entertainment.

Furthermore, in step S610, it will be determined whether the passenger touches to select the game function. When the passenger does not touch to select the game function, the process will start again; when the passenger touches to select the game function, step S620 is executed to execute the online processing process of the game algorithm. Next, in step S630, it is determined whether the passenger touches the return icon (return icon 546a in FIG. 5E). When the passenger does not touch the return icon, the execution of the game algorithm is maintained; when the passenger touches the return icon, step S640 is executed to return to the main menu (as shown in FIG. 4).

Figure 6C:
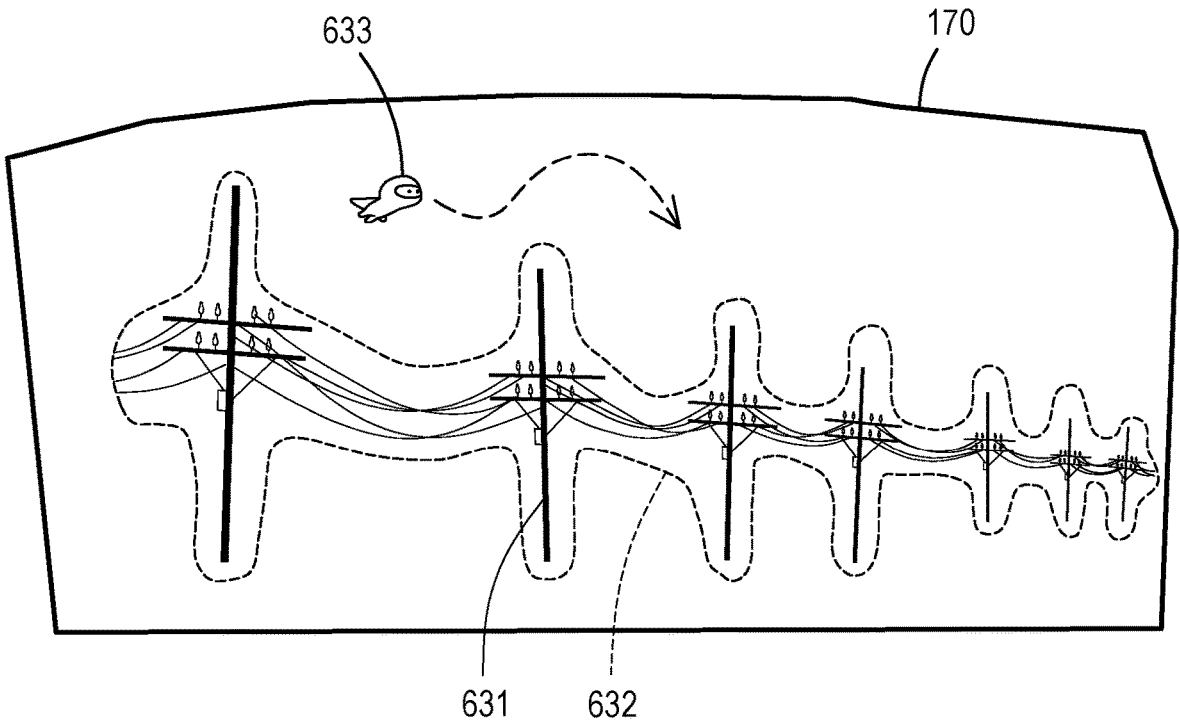
FIG. 6C is a schematic diagram showing the operation of the side window display system on vehicles in game mode according to an embodiment of the present disclosure.

FIG. 6C is a schematic diagram showing the operation of the side window display system on vehicles in game mode according to an embodiment of the present disclosure. Please refer to FIG. 1A, FIG. 1B, FIG. 4, FIG. 6A to FIG. 6C. In this embodiment, when entering the game mode, the vehicle side window display system 100 may capture the scenery 631 outside the window through the external camera 151, perform edge detection to define the edge 32 of the object in the background 631, and paste the virtual game character 633 to be combined with the background 631, thereby achieving integrated virtual and real entertainment.

Figure 7:
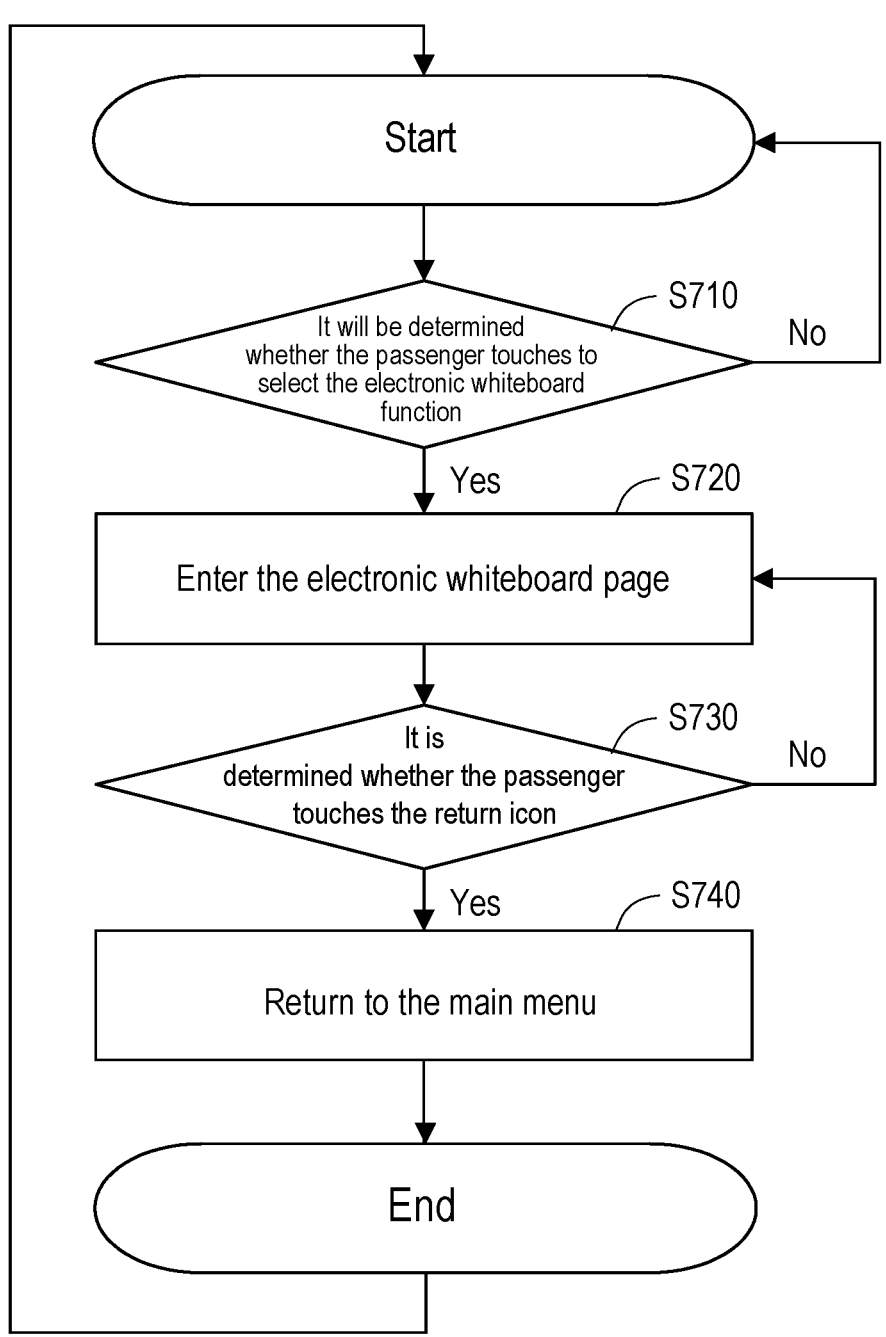
FIG. 7 is a flow chart of an electronic whiteboard mode of the side window display system on vehicles according to an embodiment of the present disclosure.

FIG. 7 is a flow chart of an electronic whiteboard mode of the side window display system on vehicles according to an embodiment of the present disclosure. Please refer to FIG. 1A, FIG. 1B, FIG. 4, and FIG. 7. In this embodiment, when the passenger touches the electronic whiteboard mode icon 430 on the transparent display 170, the vehicle side window display system 100 may enter the electronic whiteboard mode. When entering the electronic whiteboard mode, the passenger may use the vehicle window as an electronic whiteboard/canvas through the touch panel 164 attached to the transparent display 170.

Furthermore, in step S710, it will be determined whether the passenger touches to select the electronic whiteboard function. When the passenger does not touch to select the electronic whiteboard function, the process will start again; when the passenger touches to select the electronic white-board function, step S720 is executed to enter the electronic whiteboard page. Under the circumstances, the transparency of the transparent display is adjusted to the minimum (i.e. rendered opaque). Next, in step S730, it is determined whether the passenger touches the return icon (return icon 546a in FIG. 5E). When the passenger does not touch the return icon, the execution of the electronic whiteboard is maintained; when the passenger touches the return icon, step S740 is executed to return to the main menu (as shown in FIG. 4). Based on the above, when text or icons are displayed on the transparent display 170, the cockpit domain controller 110 controls the transparency distribution and brightness distribution of the transparent display 170 so that the transparency of the entire transparent display 170 is reduced.

Figure 8:
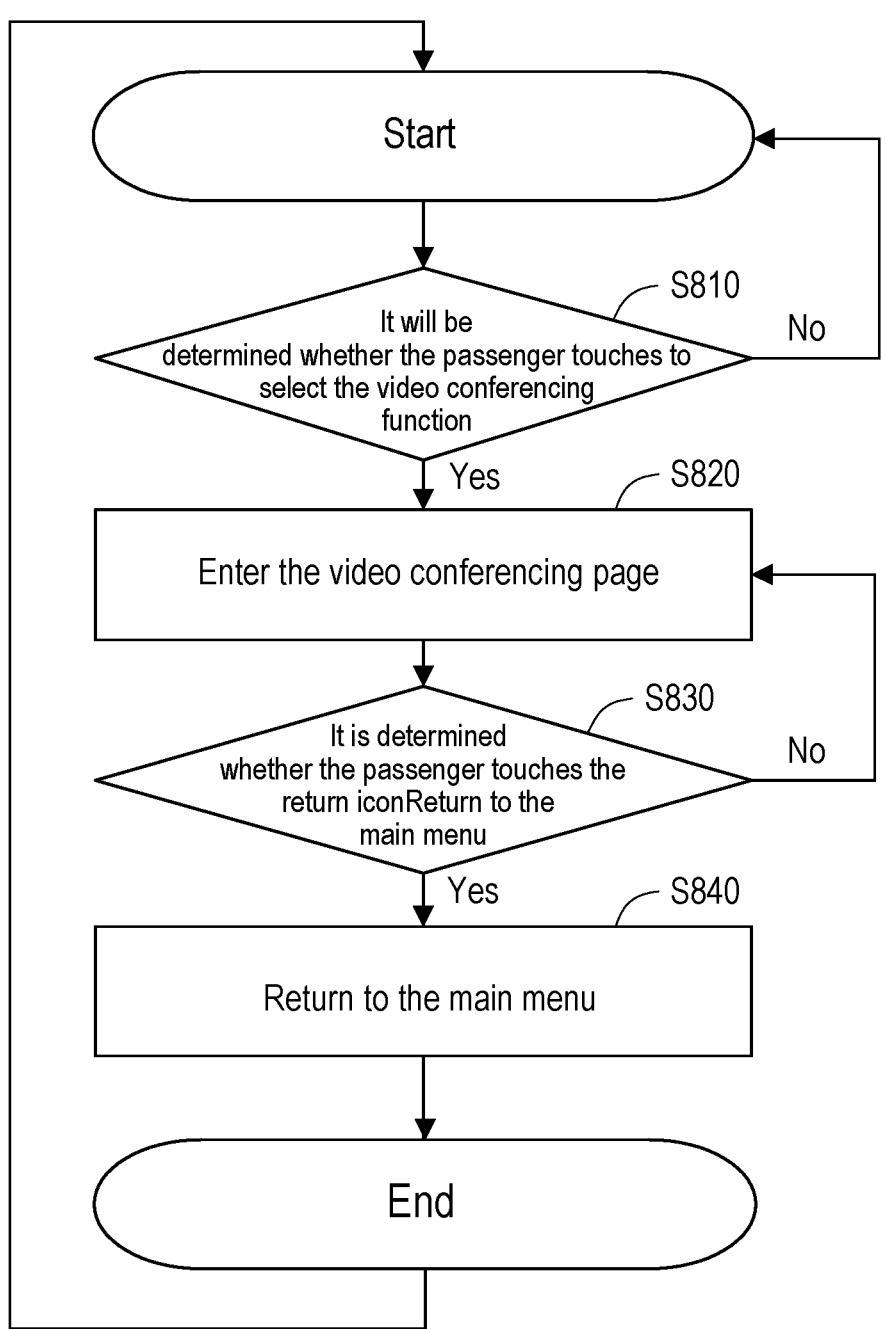
FIG. 8 is a flow chart of a video conferencing mode of the side window display system on vehicles according to an embodiment of the present disclosure.

FIG. 8 is a flow chart of a video conferencing mode of the side window display system on vehicles according to an embodiment of the present disclosure. Please refer to FIG. 1A, FIG. 1B, FIG. 4, and FIG. 8. In this embodiment, when the passenger touches the video conferencing mode icon 440 on the transparent display 170, the vehicle side window display system 100 may enter the video conferencing mode. When entering the video conferencing mode, the passenger may conduct video conferencing through the in-car camera and networking functions.

Furthermore, in step S810, it will be determined whether the passenger touches to select the video conferencing function. When the passenger does not touch to select the video conferencing function, the process will start again; when the passenger touches to select the video conferencing function, step S820 is executed to enter the video conferencing page. Under the circumstances, the transparency of the transparent display 170 is adjusted to the minimum (i.e. rendered opaque). Next, in step S830, it is determined whether the passenger touches the return icon (return icon 546a in FIG. 5E). When the passenger does not touch the return icon, the execution of the video conference is maintained; when the passenger touches the return icon, step S840 is executed to return to the main menu (as shown in FIG. 4).

Figure 9:
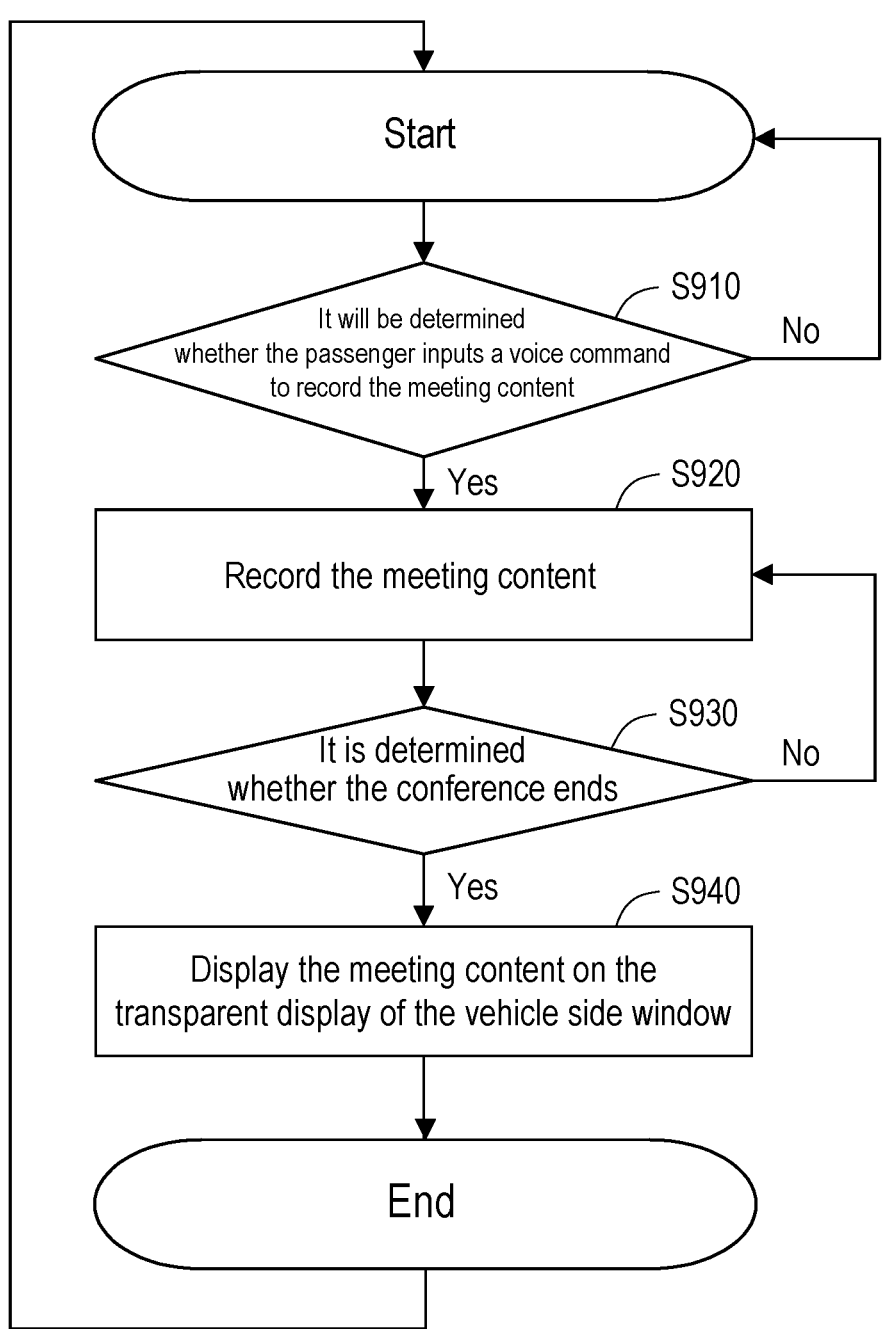
FIG. 9 is a flow chart showing triggering conference records in the video conferencing mode of the side window display system on vehicles according to an embodiment of the present disclosure.

FIG. 9 is a flow chart showing triggering conference records in the video conferencing mode of the side window display system on vehicles according to an embodiment of the present disclosure. Please refer to FIG. 1A, FIG. 1B, FIG. 4, FIG. 8 and FIG. 9. In this embodiment, when entering the video conference, recording of verbatim meeting minutes/video may be started through voice commands.

Furthermore, in step S910, it will be determined whether the passenger inputs a voice command to record the meeting content. When the passenger does not input the voice command to record the meeting content, the process will start again; when the passenger inputs the voice command to record the meeting content, step S920 is executed to record the meeting content. Next, in step S930, it is determined whether the conference ends. When the conference has not ended, the execution of the meeting content record is maintained; when the conference ends, step S940 is executed to display the meeting content on the transparent display 170.

Figure 10:
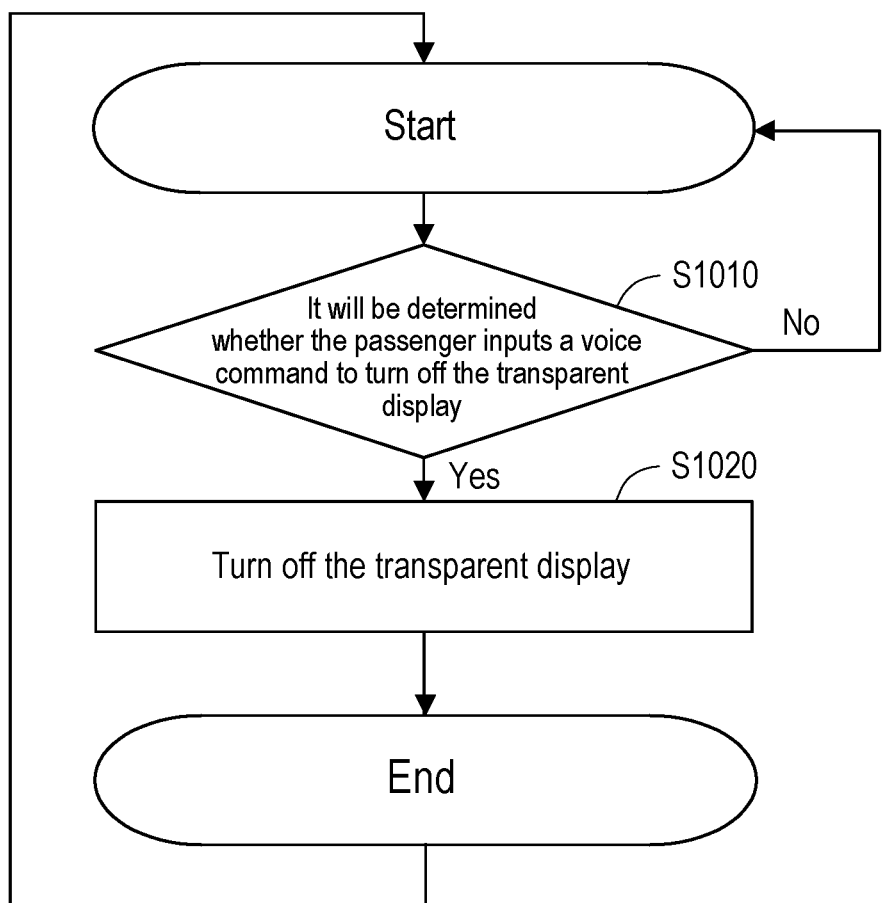
FIG. 10 is a flow chart showing the operation of triggering the display to turn off in the side window display system on vehicles according to an embodiment of the present disclosure.

FIG. 10 is a flow chart showing the operation of triggering the display to turn off in the side window display system on vehicles according to an embodiment of the present disclosure. Please refer to FIG. 1A, FIG. 1B and FIG. 10. In this embodiment, the function of triggering the display to turn off may be executed permanently, that is, executed anytime and anywhere. In other words, the passenger may turn off the transparent display 170 through the voice control function.

Further, in step S1010, it will be determined whether the passenger inputs a voice command to turn off the transparent display 170. When the passenger does not input the voice command to turn off the transparent display 170, the process will start again; when the passenger inputs the voice command to turn off the transparent display 170, step S1020 is executed to turn off the transparent display 170. Based on the above, the cockpit domain controller 110 may determine whether the voice signal is a command voice according to the passenger, and when the voice signal is a command voice, the cockpit domain controller 110 selects an operation mode based on the command voice.

Figure 11:
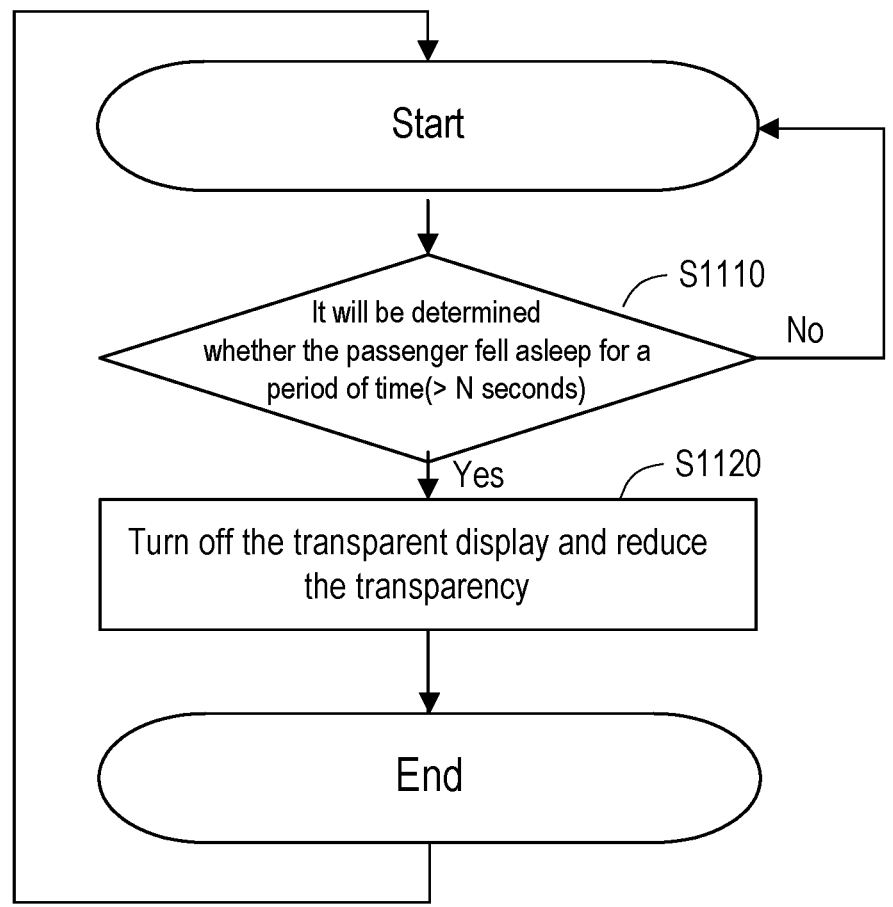
FIG. 11 is a flow chart showing the operation of triggering the passenger sleep mode of the side window display system on vehicles according to an embodiment of the present disclosure.

FIG. 11 is a flow chart showing the operation of triggering the passenger sleep mode of the side window display system on vehicles according to an embodiment of the present disclosure. Please refer to FIG. 1A, FIG. 1B and FIG. 11. In this embodiment, the function of triggering the passenger sleep mode may be executed permanently, that is, executed anytime and anywhere. In other words, when the passenger falls asleep, the vehicle side window display system 100 may automatically turn off the content of the transparent display 170 (e.g., paint the content into pure white or pure black) and reduce the transparency.

Furthermore, in step S1110, it will be determined that the passenger fell asleep and the sleep has lasted for a period of time (that is, >N seconds), and N is a positive integer. When the passenger falls asleep for less than N seconds, the process will restart; when the passenger falls asleep for more than N seconds, step S1120 is executed to turn off the transparent display 170 and reduce the transparency.

Based on the above, when the cockpit domain controller 110 determines that the passenger is asleep based on the passenger's eye angle and body posture and the sleep continues for a period of preset time, the cockpit domain controller 110 controls the transparency distribution and brightness distribution of the transparent display 170 to reduce the transparency of the transparent display 170.

To sum up, in the vehicle side window display system according to the embodiment of the present disclosure, through the sensors disposed inside and outside the vehicle, the cockpit domain controller may sense the current environment information inside and outside the vehicle to control the corresponding transparency adjustment and brightness adjustment of the transparent display. In this way, it is possible to allow passengers to have virtual and real interactive experience with the image outside the window, thereby enhancing immersive experience and improving applicability of vehicles.

Although the present disclosure has been disclosed above through embodiments, it is not intended to limit the present disclosure. Anyone with ordinary knowledge in the technical field can make some modifications and refinement without departing from the spirit and scope of the present disclosure, so the protection scope of the present disclosure shall be determined by the appended claims.

What is claimed is:
1. A vehicle side window display system, comprising:
a transparent display disposed on a side window of a vehicle;
at least one external sensor detecting an external environment of the vehicle to provide external environment information;

at least one internal sensor detecting an internal environment of the vehicle to provide internal environment information;

a controller coupled to the transparent display, the at least one external sensor and the at least one internal sensor to select an operation mode based on the internal environment information, and control a transparency distribution and a brightness distribution of the transparent display based on the operation mode and the external environment information;

wherein when the controller determines that the vehicle is in a parking state, the controller determines whether a passenger is to open a door and determines whether a car is coming from behind the vehicle, wherein the passenger is to open the door is determined by a door-opening intention score based on the passenger's gaze area, the passenger's face angle, a turning angle of the passenger's body, and a distance between the passenger's hand and a door handle.

2. The vehicle side window display system according to claim 1, wherein the at least one internal sensor comprises an internal light sensor to detect an internal light brightness inside the vehicle, and the at least one external sensor comprises an external light sensor to detect an external light brightness outside the vehicle, wherein the controller controls the transparency distribution and the brightness distribution of the transparent display based on a brightness error of the internal light brightness and the external light brightness.

3. The vehicle side window display system according to claim 1, wherein the at least one internal sensor comprises an internal camera to detect a viewing angle of passenger's eyes and a body posture of the passenger.

4. The vehicle side window display system according to claim 3, wherein when the controller determines that the passenger is about to open the door and determines that the car is coming from behind the vehicle, the controller controls the transparency distribution and the brightness distribution of the transparent display to display a warning message of an approaching car on the transparent display.

5. The vehicle side window display system according to claim 3, wherein the at least one external sensor comprises an external camera to detect an external environment image outside the vehicle, wherein the at least one internal sensor comprises a microphone to detect a voice signal from the passenger, wherein the controller detects a target of interest (TOI) corresponding to the passenger in the external environment image based on a voice recognition result of the voice signal, and determines a projection position of the TOI on the transparent display based on the viewing angle, and wherein the controller controls the transparency distribution and the brightness distribution of the transparent display to mark the projection position on the transparent display.

6. The vehicle side window display system according to claim 5, wherein the controller further controls the transparency distribution and the brightness distribution of the transparent display to display TOI information next to the projection position on the transparent display.

7. The vehicle side window display system according to claim 3, wherein when the controller determines that the passenger is asleep based on the viewing angle of the passenger's eyes and the body posture of the passenger and the passenger has fallen asleep for a period of preset time, the controller controls the transparency distribution and the brightness distribution of the transparent display to reduce a transparency of the transparent display.

8. The vehicle side window display system according to claim 1, wherein the at least one internal sensor comprises a touch panel to detect a passenger touching or pressing the transparent display, wherein the controller selects the operation mode based on one of operation icons touched by the passenger, and the controller drags one of the operation icons, a game icon, or a TOI area in an external image based on a pressing of the passenger on the transparent display.

9. The vehicle side window display system according to claim 1, wherein the controller controls the transparency distribution and the brightness distribution of the transparent display so that a transparency of at least one area displaying a text or an icon on the transparent display is reduced.

10. The vehicle side window display system according to claim 1, wherein when text or icons are displayed on the transparent display, the controller controls the transparency distribution and the brightness distribution of the transparent display so that a transparency of the entire transparent display is reduced.

11. The vehicle side window display system according to claim 1, wherein the at least one internal sensor comprises a microphone to detect a voice signal from a passenger, wherein the controller determines whether the voice signal is a command voice, when the voice signal is the command voice, the controller selects the operation mode based on the command voice.

12. The vehicle side window display system according to claim 1, wherein the transparent display is a micro light-emitting diode display.

\* \* \* \* \*